Dec. 25, 1928.
E. M. SCOVILLE
TELESCOPIC OILER
Filed Sept. 20, 1923
1,696,736
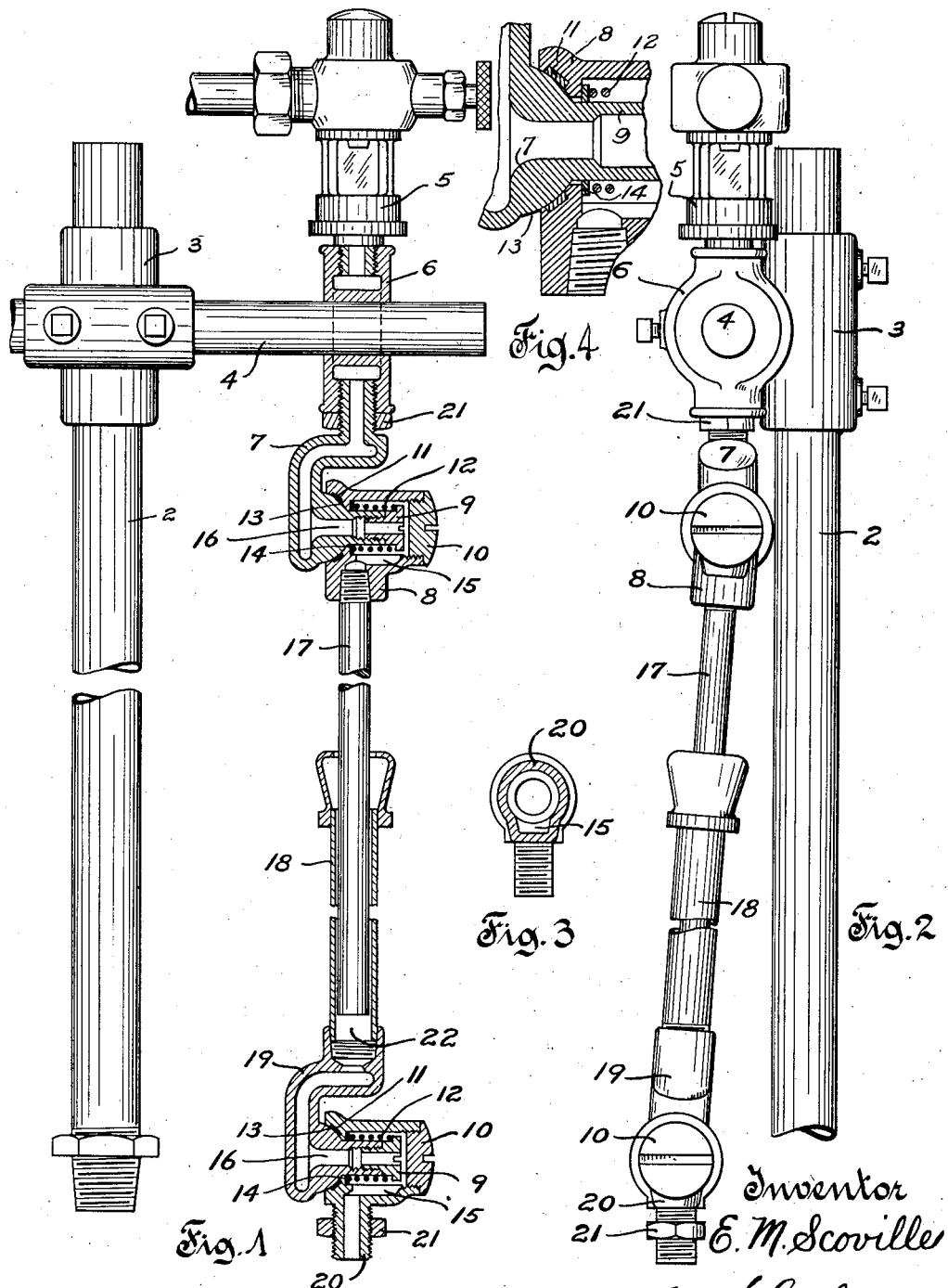

Patented Dec. 25, 1928.

1,696,736

UNITED STATES PATENT OFFICE.

EUGENE M. SCOVILLE, OF MILWAUKEE, WISCONSIN, ASSIGNOR OF ONE-HALF TO FLOYD L. SWANBERG, OF DANVILLE, ILLINOIS.

TELESCOPIC OILER.

Application filed September 20, 1923. Serial No. 663,916.

This invention relates in general to improvements in the art of lubrication, and relates more specifically to improvements in the construction and operation of automatically adjustable lubricant conducting structure for conveying oil or the like from a stationary or movable element to a relatively movable element, the invention being disclosed herein as applied to a telescopic oiler.

An object of the invention is to provide an improved telescopic oiler which is simple in construction and efficient in operation.

Some of the more specific objects and advantages of the present improvement are as follows:—

To provide an extremely simple, compact and neat appearing telescopic oiling device, the exterior of which is devoid of movable projections which are liable to injure attendants.

To provide an oil conducting conduit which is adapted for connecting relatively movable elements of various machines without danger of breaking or otherwise damaging the conduit structure and without permitting undesirable leakage or waste of oil.

To provide an oiling device which affords unobstructed passages for conducting the oil, and all elements of which are freely accessible for adjustment, inspection and removal of parts.

To provide a mechanism for conveying lubricant, various elements of which are interchangeable and which may be manufactured, installed and operated at minimum cost.

To provide various improvements in the details of construction and operation of telescopic oiling devices which will enhance to a maximum the efficiency and economy of such devices.

These and other objects and advantages of the present invention will be apparent in the course of the accompanying description.

A clear conception of an embodiment of the present improvement and of the operation of devices constructed in accordance therewith, may be had by referring to the drawing accompanying and forming a part of this specification in which like reference characters designate the same or similar parts in the various views.

Fig. 1 is a fragmentary central longitudinal section through an improved telescopic oiler.

Fig. 2 is a fragmentary side elevation of the improved telescopic oiler.

Fig. 3 is a transverse section through one of the knuckle elements of an improved telescopic oiler.

Fig. 4 is a fragmentary enlarged sectional view of the upper knuckle.

The improved telescopic oiler illustrated herein comprises generally a stationary upright standard 2; a horizontal cross bar 4 adjustably supported from the standard 2 by means of a connection 3; a hollow suspension fitting 6 adjustably associated with the cross bar 4; and upper knuckle consisting of separable elements 7, 8 suspended from the fitting 6; a lower knuckle consisting of separable elements 19, 20 supported upon the cross-head or other movable machine element which is to be lubricated; a telescopic connection consisting of inner and outer tubular members 17, 18, respectively, connecting the upper and lower knuckles; and a lubricant supply source or means 5 communicating with the interior of the fitting 6.

The stationary standard 2, cross bar 4, connection 3 and fitting 6 are of well known construction and form no part of the present improvement except in combination with other elements as set forth in the claims. The connection 3 permits convenient adjustment of the cross bar 4 along and around the standard 2 and is also formed to permit longitudinal adjustment of the cross bar 4 transversely of the standard 2. The fitting 6 has a hollow interior and is movably mounted relatively to the cross bar 4, means being provided to lock this fitting in adjusted position. The lubricant supply means 5 may assume various forms such as an oil or grease cup, a sight feed lubricator, or a lubricant supply pump.

The upper knuckle of the telescopic oiler comprises a hollow element 7 rigidly attached to the fitting 6 by means of a threaded shank and a lock nut 21 and provided with a lateral hollow cylindrical projection 9; and a hollow element 8 embracing the projection 9 and provided with a threaded socket within which the upper end of the inner tubular member 17 is rigidly secured. The knuckle elements 7, 8 are preferably constructed of bronze and coact with each other along spherical zone surfaces forming an annular bearing 13 which surrounds the projection 9. In order to permit limited relative universal movement of the elements 7, 8, the inner edge of the zone surface of the element 8 is spaced from the adjacent portion of the projection 9, as shown in Fig. 4. Leakage or escape of oil past the spherical bearing 13 may be positively prevented by means of an annular packing 11 formed of leather or other suitable packing material embedded in one of the elements 7, 8. A helical compression spring 12 disposed around and reacting against the cylindrical projection 9 serves to maintain contact between the elements 7, 8 at the spherical bearing 13. A hardened steel washer 14 coacting with an inner surface of the element 8 engages one end of the spring 12 while an adjustable and removable flanged plug secured to the projection 9 engages the opposite end of the spring 12. A removable cap 10 secured to the knuckle element 8 serves to permit ready access to the interior of the upper knuckle for inspection or removal of the packing 11, washer 14, spring 12 and of the spring retaining and adjusting plug. The hollow interior of the knuckle elements 7, 8 and of the projection 9 provides a continuous unobstructed conduit 16 for lubricant connecting the fitting 6 with the telescopic connection 17, the element 8 preferably being provided with an enlargement or recess 15 for insuring freedom of flow of the fluid to the connection 17 past the projection 9.

The lower knuckle of the telescopic oiler comprises a hollow element 19 rigidly attached to the lower extremity of the outer tubular member 18 and provided with a lateral hollow cylindrical projection 9; and a hollow element 20 embracing the projection 9 and provided with a threaded shank and a lock nut 21 for rigidly attaching the element 20 to the lubricant receiving movable member. The knuckle elements 19, 20 are preferably constructed of bronze and coact with each other along spherical zone surfaces forming an annular bearing 13 which surrounds the projection 9. In order to permit limited relative universal movement of the elements 19, 20, the inner edge of the zone surface of the element 20 is spaced from the adjacent portion of the projection 9, in a manner similar to that shown in Fig. 4. Leakage or escape of oil past the spherical bearing 13 may be positively prevented by means of an annular packing 11 formed of leather or other suitable packing material embedded in one of the elements 19, 20. A helical compression spring 12 disposed around and reacting against the cylindrical projection 9 serves to maintain contact between the elements 19, 20 at the spherical bearing 13. A hardened steel washer 14 coacting with an inner surface of the element 20 engages one end of the spring 12 while an adjustable and removable flanged plug secured to the projection 9 engages the opposite end of the spring 12. A removable cap 10 secured to the knuckle element 20 serves to permit ready access to the interior of the lower knuckle for inspection or removal of the packing 11, washer 14, spring 12 and of the spring retaining and adjusting plug. The hollow interior of the knuckle elements 19, 20 and of the projection 9 provides a continuous unobstructed conduit 16 for lubricant, connecting the passage 22 of the telescopic member 18 with the oil utilizing mechanism, not shown, the element 20 preferably being provided with a recess 15 for insuring free flow of lubricant around the projection 9.

The elements 7, 19 of the upper and lower knuckles are alike except that the upper element 7 has an external thread coacting with an internal thread of the fitting 6, while the lower element 19 has an internal thread coacting with an external thread of the telescopic member 18. The elements 7, 19 may however be cast from the same pattern and in some instances these elements may be formed identical in structure. The elements 8, 20 of the upper and lower knuckles are also alike except that the upper element 8 has an internal thread coacting with an external thread of the telescopic member 17, while the lower element 20 has an external thread coactable with an internal thread of the cross-head. The elements 8, 20 may likewise be cast from the same pattern and may in some instances be formed identical in structure. The packings 11, washers 14, springs 12, caps 10, and spring retaining and adjusting plugs of the upper and lower knuckles are identical in structure and are interchangeable.

During normal operation of the improved telescopic oiler, the cross-head or other mechanism which is receiving oil from the outlet of the lower knuckle element 20, is being reciprocated horizontally past the standard 2 and below the fitting 6, thus causing the lower knuckle to assume horizontal rectilineal reciprocatory motion. As the reciprocation of the lower knuckle continues, the upper and lower knuckle elements 8, 19 are oscillated about the horizontal axes of the lateral projections 9 and relatively to the knuckle elements 7, 20 respectively which latter elements are retained in vertical position. The telescopic connection between the upper knuckles is intermittently lengthened and shortened by virtue of the co-acting inner and outer tubular members 17, 18, which maintain a conduit connection between the knuckles. The lubricant delivered either under pressure or by gravity from the supply means 5 flows freely through the unobstructed passages 16, 22 in the knuckles and in the telescopic connection respectively, to the mechanism which is to be lubricated. The lubricant passes successively through the fitting 6, element 7, element 8, member 17, member 18, element 19 and element 20 and is prevented from flowing in direct contact with the joints afforded by the spherical bearings 13, by means of the transverse projections 9 and the recesses 15.

If the vertical axes of the upper and lower knuckle elements, 7, 20 are relatively movable in the same vertical plane, there is no transverse movement of the elements 8, 20 relatively to the projections 9 of the elements 7, 19 respectively, and the spherical bearings 13 serve a pivotal function only. If the alinement of the elements 7, 20 is not perfect, then the bearings 13 become universal bearings and permit transverse as well as pivotal movements of the elements 8, 20 relatively to the projections 9 of the elements 7, 19 repsectively, thus preventing undesirable stress in the knuckles and other parts of the mechanism. The springs 12 and packings 11 effectively prevent escape of oil past the bearings 13 and the tension of the spring 12 may be readily adjusted by removing the caps 10 and turning the spring retaining plugs coacting with the projectings 9. The steel washers 14 protect the ends of the springs 12 and prevent the spring ends from moving with the relatively oscillating elements 8, 20. The knuckles may be completely dismantled by removal of the spring retaining plugs and the internal elements of the knuckles are readily interchangeable.

The entire mechanism is extremely simple and compact and the universal bearings 13 permit installation of the apparatus with less care and accuracy than is necessary with the devices of the prior art. The movable elements are all devoid of the projections which are liable to injure attendants, and the various parts when properly finished present a neat and mechanical appearance.

It should be understood that it is not desired to limit the invention to the exact details of construction and to the exact mode of operation herein shown and described, for various modifications within the scope of the claims may occur to persons skilled in the art.

It is claimed and desired to secure by Letters Patent:—

1. In combination, a pair of elements having mutual coaction along spherical surfaces, one of said elements having a tubular projection penetrating said surfaces and communicating with the interior of said other element and said other element having a conduit extending from said interior transversely of the axis of said projection, and a removable closure cap associated with said other element in line with said projection.

2. In combination, a pair of elements having mutual coaction along spherical surfaces, one of said elements having a tubular projection penetrating said surfaces and communicating with the interior of said other element and said other element having a conduit extending from said interior transversely of the axis of said projection, a spring within said other element for urging said elements into contact at said surfaces, and means for adjusting the tension of said spring.

3. In combination, a pair of elements having mutual coaction along spherical surfaces, one of said elements having a projection penetrating said surfaces, a spring for urging said elements into contact at said surfaces while permitting free relative movement of said elements at said surfaces, and means associated with said projection for adjusting the tension of said spring.

4. In combination, a pair of relatively movable elements having mutual coaction along spherical annular zone surfaces, one of said elements having a projection penetrating said surfaces and the other of said elements embracing said projection, and a removable cap associated with said other element in line with said projection.

5. In combination, a pair of elements relatively freely universally movable about spherical zone surfaces, a spring housed entirely within one of said elements for urging said elements into contact at said surfaces, and, means for effecting access to said spring in line with the axis of said bearing surfaces.

6. In combination, a pair of relatively pivoted elements, one of said elements having a lateral hollow projection and the other of said elements embracing said projection, a spring embracing said projection and functioning to urge said elements into contact, and means forming a recess in said other element below said spring and communicating with the interior of said projection.

7. In combination, a pair of elements having mutual coaction along spherical surfaces, one of said elements having a tubular projection penetrating said surfaces and providing a conduit extending beyond said surfaces, resilient means housed entirely within one of said elements for urging said elements into contact at said surfaces, and a closure cap associated with one of said elements for permitting access to said resilient means.

In testimony whereof, the signature of the inventor is affixed hereto.

EUGENE M. SCOVILLE.